US010443498B2

(12) United States Patent
Mosley et al.

(10) Patent No.: US 10,443,498 B2
(45) Date of Patent: Oct. 15, 2019

(54) GAS TURBINE ENGINE COOLING FLUID METERING SYSTEM

(71) Applicant: United Technologies Corporation, Hartford, CT (US)

(72) Inventors: John H. Mosley, Portland, CT (US); Michelle Diana Stearns, Lebanon, CT (US); Michael Luther Comeau, Manchester, CT (US); James P. Chasse, Wethersfield, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 1132 days.

(21) Appl. No.: 14/818,944

(22) Filed: Aug. 5, 2015

(65) Prior Publication Data

US 2016/0047311 A1    Feb. 18, 2016

Related U.S. Application Data

(60) Provisional application No. 62/037,631, filed on Aug. 15, 2014.

(51) Int. Cl.
*F01D 25/12* (2006.01)
*F02C 3/04* (2006.01)
(Continued)

(52) U.S. Cl.
CPC ............ *F02C 7/12* (2013.01); *F01D 25/12* (2013.01); *F02C 3/04* (2013.01); *F02C 7/18* (2013.01); *G01F 1/42* (2013.01); *Y02T 50/675* (2013.01)

(58) Field of Classification Search
CPC .... F01D 25/12; F02C 7/12; F02C 7/16; F02C 7/18; G01F 1/42
See application file for complete search history.

(56) References Cited

U.S. PATENT DOCUMENTS 1,518,279 A * 12/1924 Smoot ................... G01F 1/372
138/44
2,445,837 A * 7/1948 McKenzie, Jr. ......... F02C 7/18
415/116

(Continued)

FOREIGN PATENT DOCUMENTS

| GB | 695482 | 8/1953 |
| WO | 2014051672 | 4/2014 |

OTHER PUBLICATIONS

Extended European Search Report for European Application No. 15181153.6, dated Jan. 13, 2106.

*Primary Examiner* — Igor Kershteyn
*Assistant Examiner* — Christopher R Legendre
(74) *Attorney, Agent, or Firm* — Carlson, Gaskey & Olds, P.C.

(57) ABSTRACT

A cooling fluid system for a gas turbine engine includes a fluid source. A turbine section includes first and second components. A fluid supply system has a primary pipe that is configured to provide a cooling supply fluid from the fluid source to a fluid fitting having a fluid junction. The fluid junction is in fluid communication with and is configured to supply a first cooling fluid to the first component. The fluid junction is in fluid communication with and is configured to supply a second cooling fluid to the second component. A flow meter is upstream from the fluid junction and is configured to receive the cooling supply fluid.

13 Claims, 3 Drawing Sheets

(51) Int. Cl.
*F02C 7/12* (2006.01)
*F02C 7/18* (2006.01)
*G01F 1/42* (2006.01)

(56) References Cited

U.S. PATENT DOCUMENTS

| | | | |
|---|---|---|---|
| 2,896,906 A | 7/1959 | Durkin | |
| 3,339,832 A | 9/1967 | Duecker | |
| 3,805,612 A * | 4/1974 | Shiba | G01F 1/42 |
| | | | 138/44 |
| 5,219,190 A | 6/1993 | Grammel, Jr. | |
| 5,232,337 A | 8/1993 | Glynn | |
| 5,292,227 A * | 3/1994 | Czachor | F01D 25/162 |
| | | | 415/142 |
| 5,407,237 A * | 4/1995 | Smolowitz | F01D 9/06 |
| | | | 285/114 |
| 5,413,145 A * | 5/1995 | Rhyne | F15D 1/0005 |
| | | | 138/40 |
| 5,482,431 A * | 1/1996 | Taylor | F01D 9/065 |
| | | | 415/111 |
| 5,645,397 A | 7/1997 | Soechting et al. | |
| 6,327,844 B1 * | 12/2001 | Kaminske | F04D 29/644 |
| | | | 60/782 |
| 6,416,279 B1 * | 7/2002 | Weigand | F01D 5/186 |
| | | | 415/115 |
| 6,457,934 B2 | 10/2002 | Li | |
| 6,485,255 B1 * | 11/2002 | Care | F01D 5/187 |
| | | | 415/12 |
| 6,945,123 B1 * | 9/2005 | Kuehl | A61M 16/01 |
| | | | 73/861.42 |
| 8,307,662 B2 | 11/2012 | Turco | |
| 8,464,761 B2 * | 6/2013 | Young | F15D 1/02 |
| | | | 110/260 |
| 9,170,137 B2 * | 10/2015 | Evans | G01F 1/40 |
| 9,261,022 B2 * | 2/2016 | Saha | F01D 17/141 |
| 2009/0226327 A1 * | 9/2009 | Little | F01D 5/082 |
| | | | 416/96 A |
| 2014/0157791 A1 * | 6/2014 | Saha | F01D 17/141 |
| | | | 60/785 |
| 2014/0311254 A1 * | 10/2014 | Evans | G01F 1/40 |
| | | | 73/861.61 |
| 2016/0047311 A1 * | 2/2016 | Mosley | F02C 3/04 |
| | | | 415/177 |

* cited by examiner

GAS TURBINE ENGINE COOLING FLUID METERING SYSTEM

CROSS-REFERENCE TO RELATED APPLICATIONS

This application claims priority to U.S. Provisional Application No. 62/037,631, which was filed on Aug. 15, 2014 and is incorporated herein by reference.

BACKGROUND

This disclosure relates to a flow meter for use in a cooling fluid system of a gas turbine engine.

A gas turbine engine typically includes a fan section, a compressor section, a combustor section and a turbine section. Air entering the compressor section is compressed and delivered into the combustor section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

The turbine section is subjected to hot temperatures during engine operation. Typically, a cooling fluid, such as compressor bleed air, is provided to the turbine section to cool various components and provide pressurized fluid for other purposes.

In one example, the cooling fluid system includes four pipes from the high pressure compressor section that supply cooling air to mid-turbine frame vanes through fluid fittings. Smaller pipes are secured to the fluid fitting to a supply cooling fluid to I-rods that run radially through some of the mid-turbine frame vanes.

Airflow to the mid-turbine frame vanes and the I-rods is metered to provide a desired balance of cooling fluid to each location. Typically, a metering plate is bolted between the fluid fitting and the outer case of the turbine section. As a result, this metering plate is downstream from the smaller pipes supplying cooling fluid to the I-rods. Additionally, typically an unequal amount of smaller pipes are secured to each of the fittings. In one of the examples, each of two fluid fittings have three smaller pipes, one fluid fitting has two smaller pipes. The fourth fluid fitting has no smaller pipes, but feeds only one of the mid-turbine frame vanes.

SUMMARY

In one exemplary embodiment, a cooling fluid system for a gas turbine engine includes a fluid source. A turbine section includes first and second components. A fluid supply system has a primary pipe that is configured to provide a cooling supply fluid from the fluid source to a fluid fitting having a fluid junction. The fluid junction is in fluid communication with and is configured to supply a first cooling fluid to the first component. The fluid junction is in fluid communication with and is configured to supply a second cooling fluid to the second component. A flow meter is upstream from the fluid junction and is configured to receive the cooling supply fluid.

In a further embodiment of the above, the fluid source is bleed air from a compressor section.

In a further embodiment of any of the above, the fluid source is a high pressure compressor.

In a further embodiment of any of the above, the first and second components are provided by a mid-turbine frame.

In a further embodiment of any of the above, the first component is a mid-turbine frame vane.

In a further embodiment of any of the above, the first component is configured to supply the first cooling fluid to a turbine rotor.

In a further embodiment of any of the above, the second component is an I-rod that extends radially through the mid-turbine frame vane.

In a further embodiment of any of the above, the second component is configured to supply the second cooling fluid to a turbine rotor.

In a further embodiment of any of the above, the fluid supply system includes a secondary pipe fluidly connecting the fluid junction to the I-rod.

In a further embodiment of any of the above, the flow meter is a wall that has an orifice that is radiused on a surface facing into the cooling supply fluid.

In a further embodiment of any of the above, a surface opposite the radiused surface is non-radiused.

In a further embodiment of any of the above, the flow meter, primary pipe and fluid fitting are welded to one another.

In a further embodiment of any of the above, a secondary pipe is welded to the fluid fitting and is configured to supply the second cooling fluid to the second component.

In another exemplary embodiment, a fluid supply system for a gas turbine engine includes a fluid fitting that has a fluid junction. The fluid junction includes a first fluid port that is in fluid communication with and is configured to supply a first cooling fluid to a first component. The fluid junction includes a second fluid port that is in fluid communication with and is configured to supply a second cooling fluid to a second component. A primary pipe is fluidly connected to the fluid fitting. A flow meter is arranged upstream from the fluid junction and is configured to receive a cooling supply fluid from a fluid source.

In a further embodiment of any of the above, the flow meter is arranged between the primary pipe and the fluid fitting.

In a further embodiment of any of the above, the flow meter is welded to the primary pipe and the fluid fitting.

In a further embodiment of any of the above, a secondary pipe is secured to the fluid fitting and is configured to supply the second cooling fluid to the second component.

In a further embodiment of any of the above, multiple secondary pipes are secured to the fluid fitting and are configured to supply the second cooling fluid to a respective second component.

In a further embodiment of any of the above, the secondary pipe is welded to the fluid fitting.

BRIEF DESCRIPTION OF THE DRAWINGS

The disclosure can be further understood by reference to the following detailed description when considered in connection with the accompanying drawings wherein.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

Figure 1:
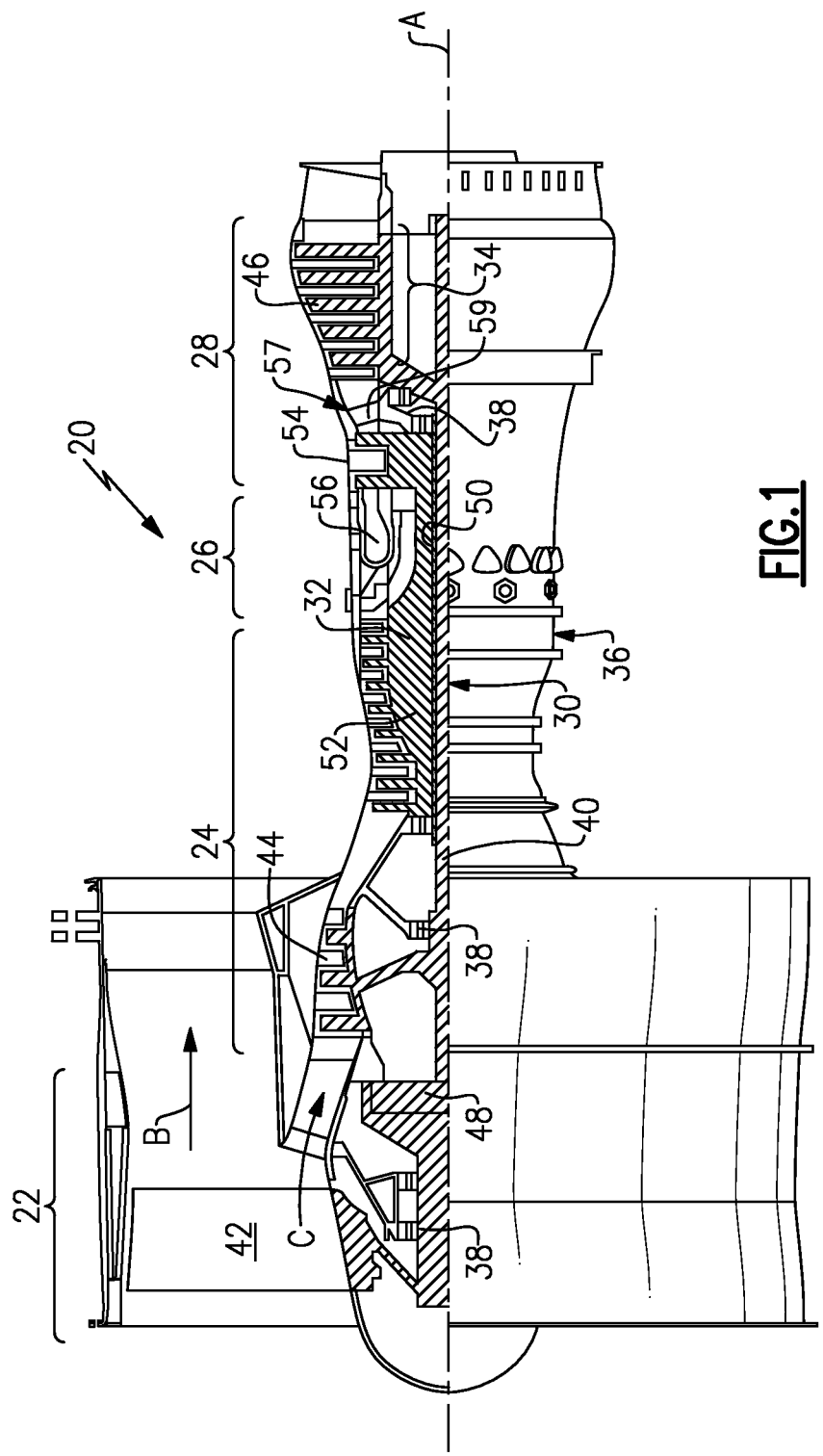
FIG. 1 schematically illustrates a gas turbine engine embodiment.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmenter section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram °R)/(518.7 °R)]^{0.5}$. The "Low corrected fan tip speed" as disclosed herein according to one non-limiting embodiment is less than about 1150 ft/second (350.5 meters/second).

Figure 2:
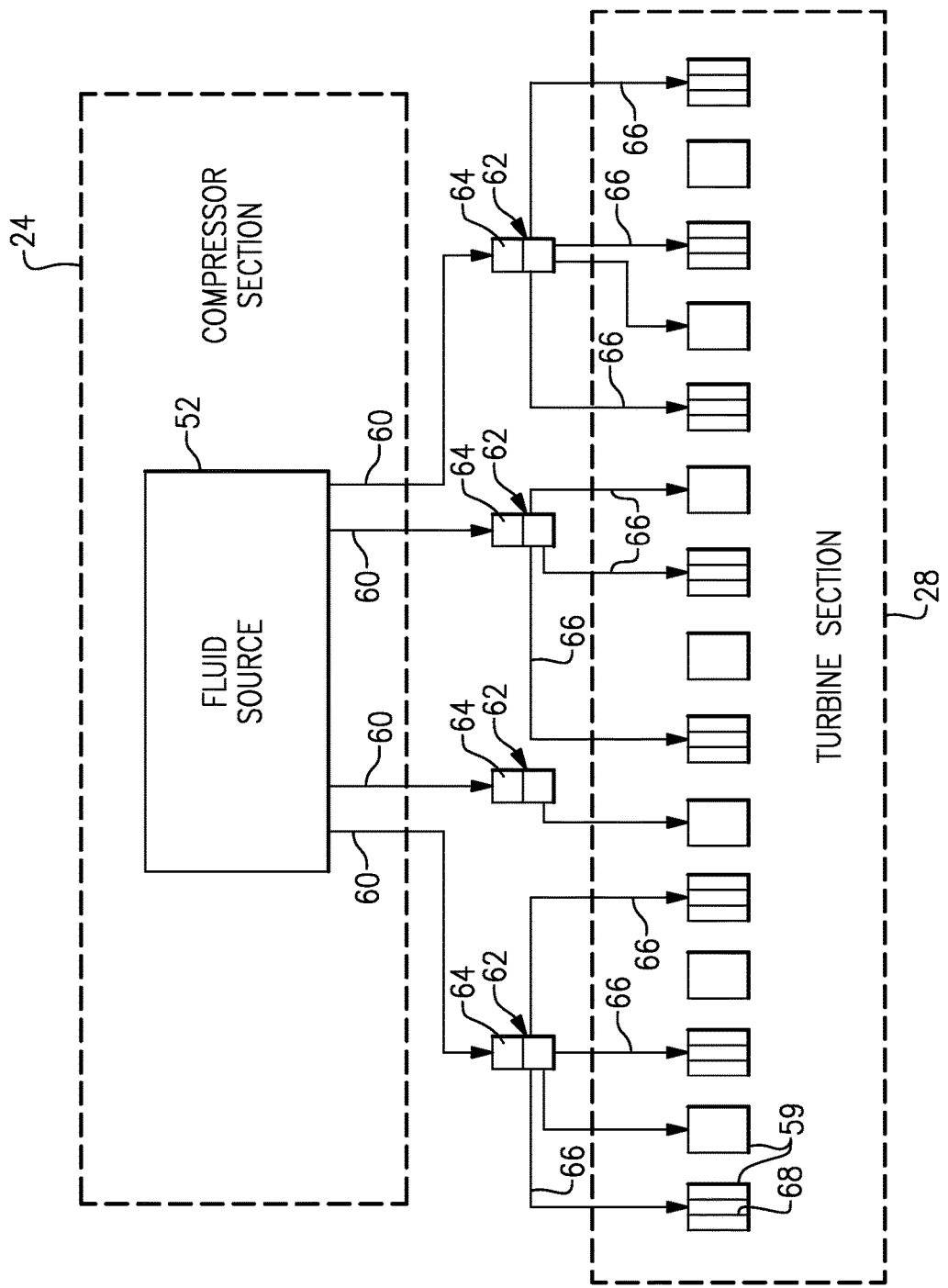
FIG. 2 is a schematic view of one example cooling air system.

An example cooling fluid system is illustrated schematically in FIG. 2. A fluid source, such as the high pressure compressor 52 of the compressor section 24, supplies a cooling fluid, such as bleed air, to first and second components in the turbine section 28. The turbine section 28 includes multiple circumferentially arranged mid-turbine frame vanes 59 arranged axially between the high and low turbine sections, 54, 46. Some of the vanes 59 of the mid-turbine frame 57 include a radially extending I-rod 68 arranged within the hollow cavity of the vane 59. The vanes 59 and I-rods 68 of the mid-turbine frame 57 respectively correspond to the first and second components in the example cooling fluid system.

Figure 4:
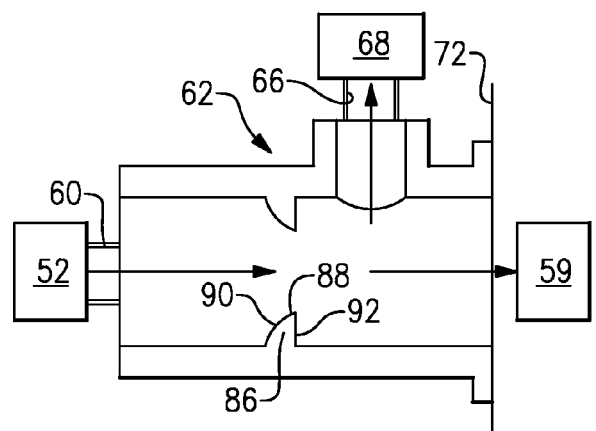
FIG. 4 is a schematic view of an example fluid fitting with a flow meter.

Cooling fluid is provided through primary pipes 60 to a fluid fitting 62, which is typically mounted on the engine static structure, for example, an outer case 72 (FIG. 4). The fluid fittings 62 each include a fluid junction that provides a cooling fluid to the vanes 59. The fluid junction of the fluid fittings 62 may also provide cooling fluid to the I-rod 68 through secondary pipes 66, which are smaller than the primary pipes 60.

Each fluid fitting 62 in the example includes a flow meter 64 arranged upstream from fluid junction and, therefore, the secondary pipe 66/I-rods 68 and the vanes 59. In one example, the primary pipe 60, fluid fitting 62, flow meter 64, and secondary pipe 66 are welded to one another to provide structural integrity and reduce the possibility of leakage.

In the example shown in FIG. 2, each primary pipe 60 may supply cooling fluid to a different number of downstream components. In the example shown, two of the fluid fittings 62 supply one vane 59 and three I-rods 68. Another fluid fitting supplies one vane 59 and two I-rods 68, and another fluid fitting 62 provides cooling fluid to one vane 59. However, it should be understood that cooling fluid may be provided to the turbine section in a manner other than illustrated in FIG. 2.

Figure 3A:
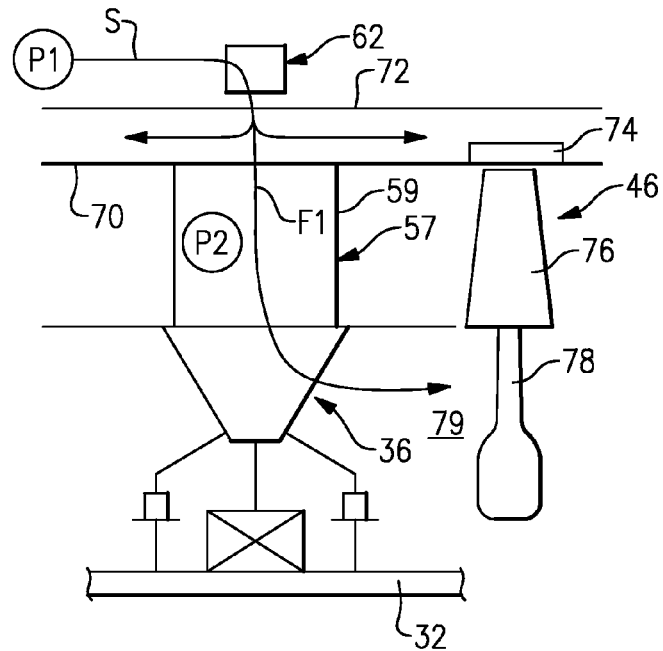
FIG. 3A is a schematic view of cooling fluid flow through a mid-turbine frame vane.
Figure 3B:
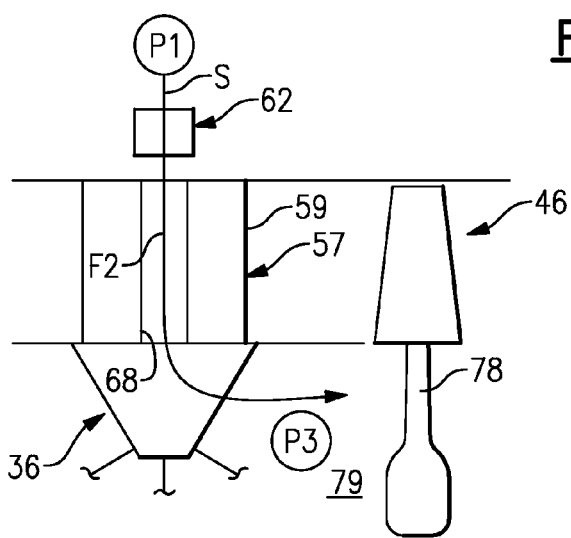
FIG. 3B is a schematic view of cooling fluid flow through an I-rod.

Referring to FIGS. 3A and 3B, the high pressure compressor supplies a cooling fluid S to the fitting 62 at a first pressure P1, which is about 180 psi (1.24 MPa) in one example. A first cooling fluid F1 on the downstream side of the fluid fitting 62 is at a pressure P2, for example, about 120 psi (0.83 MPa), which is less than the first pressure P1. The second pressure P2 is used to pressurize a portion of the turbine section to prevent hot gasses in the fluid flowpath from undesirably entering portions of the engine. For example, the first cooling fluid Fl is supplied to a region between inner and outer cases 70, 72 of the engine static structure 36 to pressurize a blade outer air seal 74. Some of the first cooling fluid Fl may supply cooling fluid to a cavity 79 arranged adjacent to a rotor 78 that supports blade 76. In the example, the rotor 78 is in a first stage of the low pressure turbine 46.

Referring to FIG. 3B, cooling fluid S passes through the flow meter 64 (FIG. 2) then the fluid fitting 62 to supply a second cooling fluid F2 to the I-rod 68. The second cooling fluid F2 is used to provide cooling fluid to the cavity 79 to cool the rotor 78. The cavity 79 is at a third pressure P3, for example, about 80 psi (0.55 MPa), which is less than the first and second pressures P1, P2.

An example fluid fitting 62 is shown in FIG. 4. The fluid fitting 62 includes a wall 86 providing an orifice 88 that is sized to meter flow from the high pressure compressor 62 to the mid-turbine frame vanes 59 and the I-rod 68. The wall 86 includes a radiused side 90 facing into the flow supplied by the high pressure compressor 52. An opposite side of the wall 86 provides a non-radius surface 92. In this manner, the geometry of the wall 86 encourages fluid flow in the flow direction. However, in the event of a pipe breakage, for example a secondary pipe to the I-rod 68, flow is encouraged to recirculate from the vanes 59 to the I-rod 68.

In this manner, the flow meter back-pressures against the leak and causes the vanes 59 to supply the majority of the leakage there by preserving more of the cooling flow to the cavity 79 through the I-rod 68. By contouring the flow meter 64 with a large lead-in radius, the size of the fluid fitting 62 can be reduced. The coefficient of discharge will be higher in the normal flow direction and lower in the reversed flow condition accompanying a broken pipe.

It should also be understood that although a particular component arrangement is disclosed in the illustrated embodiment, other arrangements will benefit herefrom. Although particular step sequences are shown, described, and claimed, it should be understood that steps may be performed in any order, separated or combined unless otherwise indicated and will still benefit from the present invention.

Although the different examples have specific components shown in the illustrations, embodiments of this invention are not limited to those particular combinations. It is possible to use some of the components or features from one of the examples in combination with features or components from another one of the examples.

Although an example embodiment has been disclosed, a worker of ordinary skill in this art would recognize that certain modifications would come within the scope of the claims. For that reason, the following claims should be studied to determine their true scope and content.

What is claimed is:

1. A fluid supply system for a gas turbine engine comprising:
    a first component and a second component;
    a fluid fitting that has a fluid junction, the fluid junction includes a first fluid port in fluid communication with and configured to supply a first cooling fluid to the first component, and the fluid junction includes a second fluid port in fluid communication with and configured to supply a second cooling fluid to the second component;
    a primary pipe fluidly connected to the fluid fitting;
    a flow meter arranged upstream from the fluid junction and configured to receive a cooling supply fluid from a fluid source, wherein the flow meter is a wall having an orifice and a radiused surface facing into the cooling supply fluid and a non-radiused surface opposite the radiused surface, the non-radiused surface extending from an outer diameter of the wall to an outer diameter of the orifice;
    a turbine section including the first and second components; and
    the primary pipe configured to provide the cooling supply fluid from the fluid source to the fluid fitting.

2. The fluid supply system according to claim 1, wherein the fluid source is bleed air from a compressor section.

3. The fluid supply system according to claim 2, wherein the fluid source is a high pressure compressor of the compressor section.

4. The fluid supply system according to claim 1, wherein the first and second components are part of a mid-turbine frame.

5. The fluid supply system according to claim 4, wherein the first component is a mid-turbine frame vane.

6. The fluid supply system according to claim 5, wherein the first component is configured to supply the first cooling fluid to a turbine rotor.

7. The fluid supply system according to claim 5, wherein the second component is an I-rod that extends radially through the mid-turbine frame vane.

8. The fluid supply system according to claim 7, wherein the second component is configured to supply the second cooling fluid to a turbine rotor.

9. The fluid supply system according to claim 7, wherein the fluid supply system includes a secondary pipe fluidly connecting the fluid junction to the I-rod.

10. The fluid supply system according to claim 1, wherein the fluid fitting is welded to the primary pipe and a secondary pipe.

11. The fluid supply system according to claim 10, wherein the secondary pipe is configured to supply the second cooling fluid to the second component.

12. The fluid supply system according to claim 1, wherein the flow meter is arranged in the fluid fitting.

13. The fluid supply system according to claim 12, wherein the primary pipe is welded to the fluid fitting.

\* \* \* \* \*